(12) United States Patent
Narayanaswami

(10) Patent No.: US 7,673,248 B2
(45) Date of Patent: Mar. 2, 2010

(54) COMBINING CALENDAR ENTRIES WITH MAP VIEWS

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 11/593,666

(22) Filed: Nov. 6, 2006

(65) Prior Publication Data

US 2008/0109718 A1    May 8, 2008

(51) Int. Cl.
*G06F 3/00*    (2006.01)
(52) U.S. Cl. .................. 715/764; 715/705; 715/714; 715/839; 715/963
(58) Field of Classification Search .................. 715/703, 715/705, 711–715, 733, 738–739, 760, 764, 715/810, 835–839, 848–852, 963; 705/8–9
See application file for complete search history.

(56) References Cited

U.S. PATENT DOCUMENTS 5,982,369 A * 11/1999 Sciammarella et al. ...... 715/835
6,670,974 B1 * 12/2003 McKnight et al. ........... 715/855
7,395,260 B2 * 7/2008 Oral et al. ...................... 707/3
7,496,563 B2 * 2/2009 Newbold et al. ............... 707/3
7,634,461 B2 * 12/2009 Oral et al. ...................... 707/3

* cited by examiner

*Primary Examiner*—Sy D Luu
(74) *Attorney, Agent, or Firm*—Michael J. Buchenhorner; Lisa M. Yamonaco

(57) ABSTRACT

A method for displaying a calendar event on an electronic map includes steps of: receiving a request to generate a map view of a selected timeline of calendar events, wherein the calendar events are associated with event locations; converting event locations to geographic locations; generating a map view showing the geographic locations of the calendar events and legends representing the calendar events; and displaying the map view with the legends shown in close proximity to the locations of the calendar events. A user can elect to switch between a display of the map view and a display of a view of the selected timeline. A user can also select to create a calendar event on an electronic map by selecting a location associated with the calendar event on the map; receive a graphical user interface display, enter information about the calendar event on the graphical user interface display, and view the electronic map.

20 Claims, 11 Drawing Sheets

| | |
|---|---|
| 8.30-9.15am | Dentist – Old Village Road |
| 10-11am | Meet with FOAK Team: J2-B34 |
| 11-Noon | Visions of Changing World – Gehry: GNF15 |
| 12.15 | Return Pleasantville Library books |
| 12.30pm | Pick up sandwich – SoGood Deli |
| 1-2.30pm | Paul Horn Kickoff: Yorktown Auditorium |
| 3-4pm | Weekly Dept Meeting 3SK29 |
| 4-5pm | Interview John Doe: My office |
| 5.15pm | Leave for airport |
| 6-9pm | AA 239 HPN: 6.35pm |
| | |

January 23rd 2006

*FIG. 2*

COMBINING CALENDAR ENTRIES WITH MAP VIEWS

CROSS-REFERENCE TO RELATED APPLICATIONS

Not applicable.

STATEMENT REGARDING FEDERALLY SPONSORED-RESEARCH OR DEVELOPMENT

Not applicable.

INCORPORATION BY REFERENCE OF MATERIAL SUBMITTED ON A COMPACT DISC

Not applicable.

FIELD OF THE INVENTION

The invention disclosed broadly relates to the field of organizing events and more particularly relates to the field of methods for displaying calendar entries with a map.

BACKGROUND OF THE INVENTION

Suburbs have experienced tremendous outward growth, yet many office jobs are still concentrated in urban areas. This forces many office workers to become long-distance commuters. In addition, many non-office workers spend their work hours traveling and commuting, often driving from appointment to appointment in a large suburban area. Take the example of the repair technician driving from appointment to appointment, often backtracking many times in the course of the day because the appointments are made at a central office, with no thought to tying appointments to location. With the rising price of gasoline this has become a critical consideration.

Employees are not the only ones who log several miles in the course of a day. Take the example of the stay-at-home mom driving her children from school to music lessons, to the dentist, and so on, while stopping to pick up groceries and the freshly-groomed family dog. Many stay-at-home moms log more miles per day than urban workers. Realtors must drive from property to property and this could encompass long distances.

The ability to sort and view calendars based on time is known, yet we do not have the ability to view or organize calendar events by location, even though location often dictates what events we can attend and when we can attend them. Most people intuitively organize their tasks by location, yet there is no known product to take advantage of this natural organizational modeling. Most of us are familiar with the concept of planning errands around a commute. Most people, when they know ahead of time that they will be driving from point A to point B, will organize tasks and make appointments around the locations between points A and B.

Referring to FIG. 1 there is shown an illustrative example of this intuitive location-based organizational planning. The example begins at home 120 with two planned events spanning a long distance: event 140—picking up a child at school at 3:00 p.m. and event 160—a 4:00 p.m. orthodontist appointment. The example ends upon returning home 120. The orthodontist 160 is distant from the school 140 and even further from the home 120. In order to maximize the driving time and gasoline consumption, the driver will automatically plan errands that coincide with the designated route from home 120 to school 140, from school 140 to the orthodontist 160, and then back home 120. FIG. 1 shows the driver has elected to make four additional stops, planned according to the original trip. The first stop 125 to return library books is between home 120 and school 140. The second stop 145 to pick up dry cleaning is between the school 140 and the orthodontist 160. Two additional stops, 175 to pick up Fido, and 185 to pick up dinner, are located between the orthodontist 160 and home 120. This is a basic example illustrating the natural way in which most people organize events around location. For most of us, this is an intuitive process.

There is a need for a method of organizing events around locations in order to overcome the shortcomings of the prior art.

SUMMARY OF THE INVENTION

Briefly, according to an embodiment of the invention a method for displaying a calendar entry on an electronic map includes steps or acts of: receiving a request to generate a map view of a selected timeline, wherein the receiving step includes receiving a calendar entry from the selected timeline, the calendar entry associated with an event location and including information about the event; generating a geographic location from the event location if the calendar entry has no associated geographic location, wherein the geographic location is a version of the event location that can be interpreted by an electronic map tool; generating a map view of the electronic map showing the geographic location of the calendar entry and a legend representing the calendar entry; and displaying the map view with the legend shown in close proximity to the location of the calendar entry shown on the map view. A user can also switch between a display of the map view and a display of a view of the selected timeline.

The method has additional steps of: searching for the event location in a database wherein geographic locations are stored in order to retrieve the geographic location associated with the event location; and if the event location was not found in the database, then converting the event location to its associated geographic location based on user input to an automated mapping tool, and storing the event location in the database, along with its associated geographic location In an alternate embodiment, a user may also select a location from a map, the location corresponding to a calendar entry and then enter information about the event wherein the information includes a legend representing the event. The method according to this alternate embodiment includes steps of: receiving the electronic map of a selected geographic location; selecting a location on the map associated with the calendar entry; receiving a graphical user interface display upon selecting the location; entering information associated with the calendar entry on the graphical user interface display, the information comprising event details and a legend to be displayed on the electronic map in close proximity to the selected location associated with the calendar entry; and viewing the electronic map.

A system for displaying a calendar entry on an electronic map, according to an embodiment of the present invention, includes: a database for storing location data; a processor for executing program code wherein the program code enables the processor to: receive the calendar entry as part of a timeline, said calendar entry associated with an event location, the calendar entry including event details; generate a geographic location from the event location if the calendar entry has no associated geographic location, wherein the geographic location is a version of the event location that can be interpreted by an electronic map tool; generate a map view of the electronic map, the map view including the geographic location of the calendar entry; and a legend representing the calendar entry; display the map view with the corresponding legend shown in close proximity to the location of the calendar entry on the map view; a network interface; an input/output interface; and a display subsystem configured for: displaying the map view; and displaying the information about the calendar entry in response to a user selecting the calendar entry.

The method can also be implemented as machine executable instructions executed by a programmable information processing system or as hard coded logic in a specialized computing apparatus.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 2 shows a calendar with scheduled events, according to the known art.

DETAILED DESCRIPTION

According to an embodiment of the invention, we describe a method to allow different views of a map that display scheduled events related to locations on a map. In another embodiment of the invention, an alternate view displays the location of an event as an underlay in a clock face. Additionally, instead of creating an event starting from a time slot as is the practice today, the user can start from a location on a map or planogram and then specify the time and detailed information for the event.

A method according to an embodiment of the present invention presents a timeline view of the events for the day, with a corresponding map view. A user can easily switch back and forth from one to the other. Adding events to the timeline dynamically inserts them into the map view. Either a text message or a legend such as an icon can represent the event.

Referring to FIG. 2 there is shown a daily calendar view 200 with several calendar entries representing common everyday activities. Each of the entries is an event scheduled at a different location. This is one illustration of a timeline view.

Figure 1:
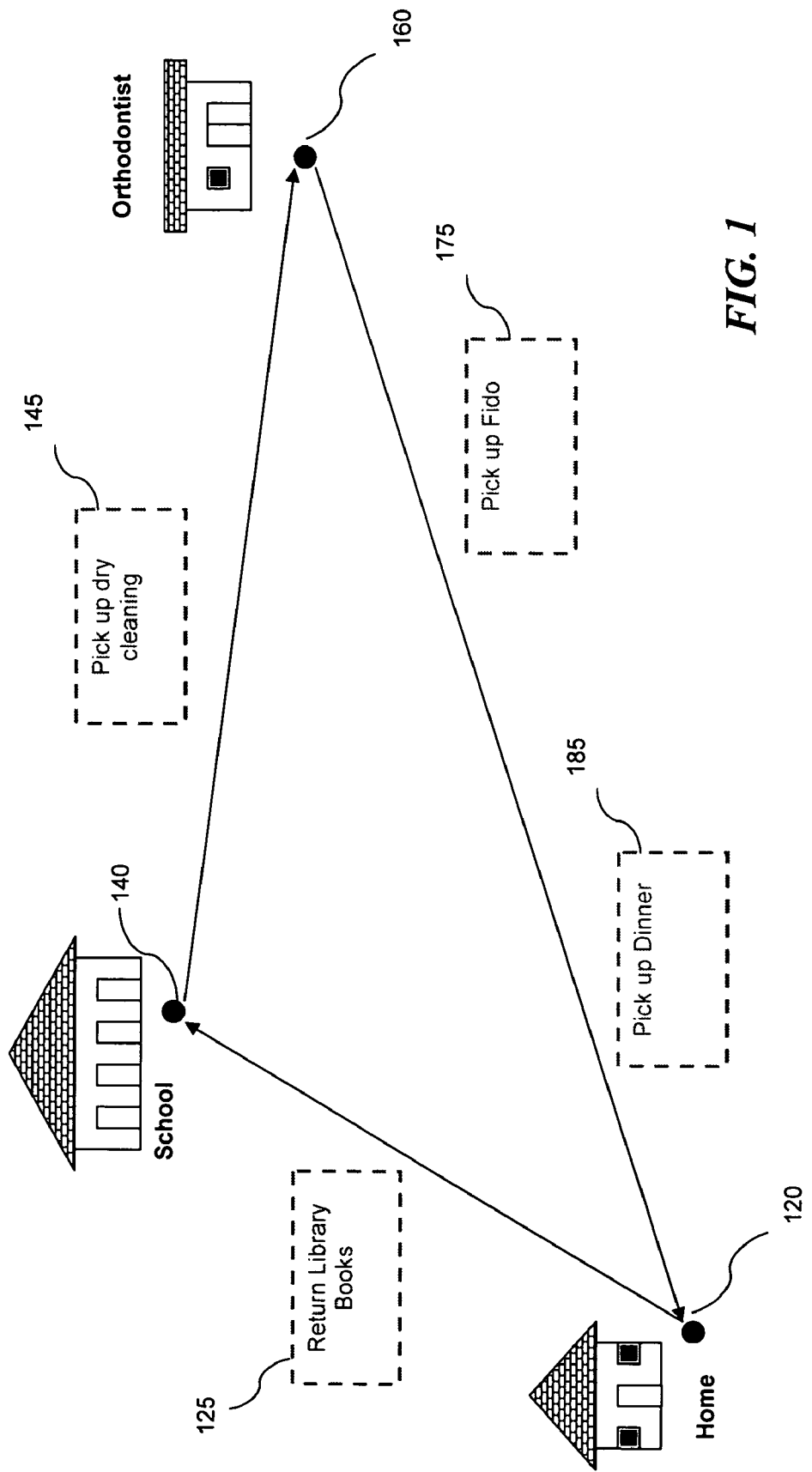
FIG. 1 is an illustration of a logical sequence of planned events tied to location, according to the known art.
Figure 3:
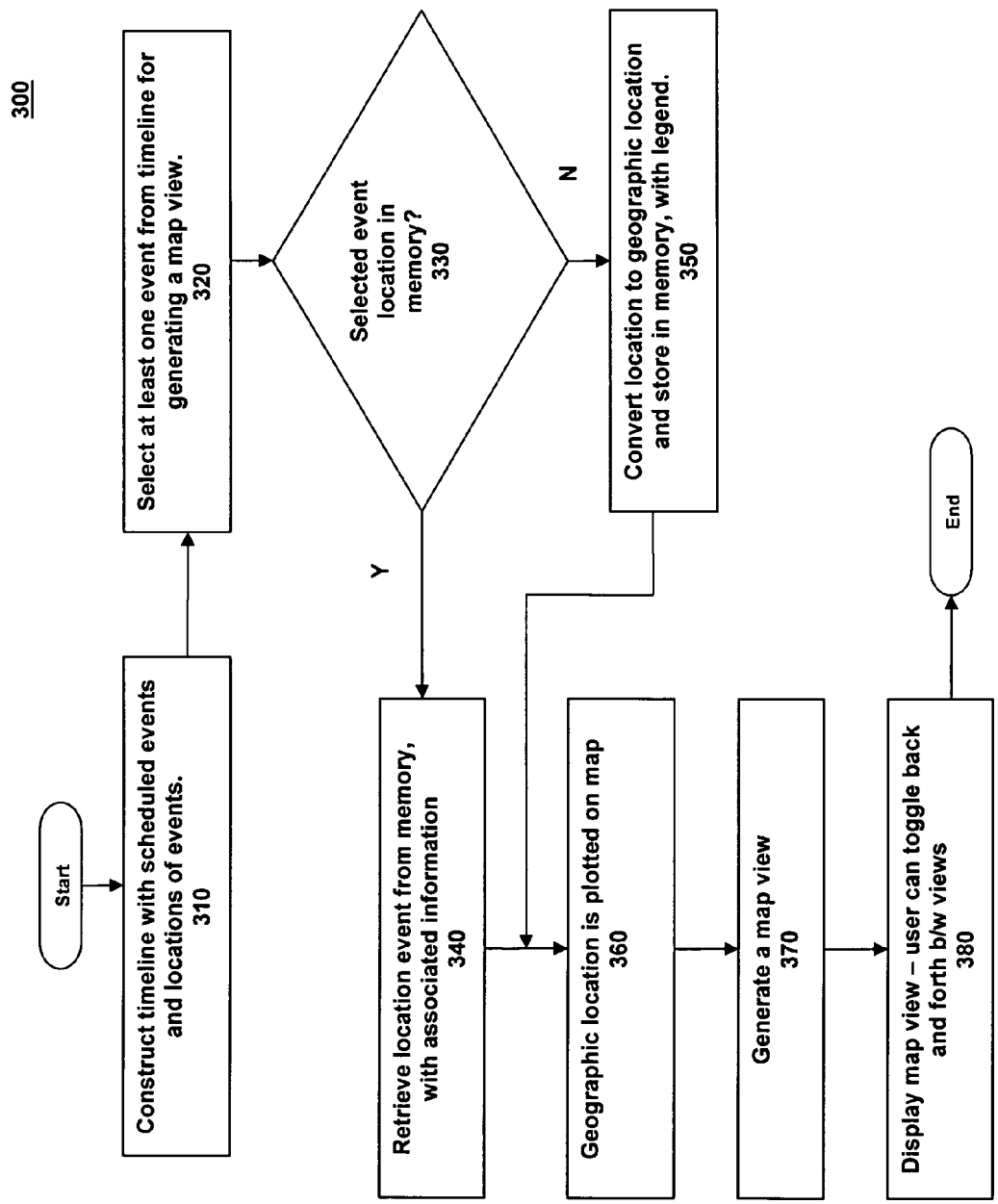
FIG. 3 is a flowchart of a method according to an embodiment of the invention.

Referring to FIG. 3 there is shown a flowchart of process steps for a method of displaying a map view of calendar entries, according to the present invention. The method begins at step 310 with a timeline showing calendar entries and their respective event locations. The timeline could be a calendar page from known calendar software applications similar to the one shown in FIG. 2, or any other grouping of scheduled events. The next step 320 begins with the timeline as input. From the timeline view as shown in FIG. 2, a particular scheduled event is selected with a location associated with it. This scheduled event must be associated with a location in order for it to be shown on a map. The selection process can be as simple as double-clicking on the event. If the user has voice recognition software, the event could be selected by voice command. The voice recognition software would receive the event location in audio format and search in a look-up table to convert the audio format to text format.

An event location is any form of referencing a location that a human would ordinarily use, such as street addresses (123 Main Street), building locations (ACME Headquarters, Building 3F), familiar sites (Mikey's school), residences (Dave's house), and the like. A geographic location is a location reference that a map reader can interpret. Sometimes event locations and geographic locations are one and the same, such as a street address. Sometimes they are not the same and in that case the event location must be converted to a geographic location.

When a calendar event is created, the user has to enter the event location. Typically users will enter human understandable locations for the event such as a conference room number, a public space or an office. The calendar system may then use the database described with respect to FIG. 11 below to convert the event location to a precise geographic location that can be interpreted by the map reader. This is done as soon as the calendar event is created. In cases where calendar events are received from other calendaring systems, the conversion from the event location to the geographic location would have to be done later, i.e., when the calendar entry is received or inspected. In some embodiments without this automatic conversion capability, the user may be presented a map or planogram when the calendar event is created and asked to mark the geographic location on the map or planogram corresponding to the human understandable event location.

Once the event is selected, a check is made in step 330 to determine if the geographic location associated with that event is already stored within the calendar event or in memory accessible to the calendar system. In this context, memory generally represents a database or any other form of persistent storage. A location may be stored in memory if the user or another user had implemented this process before on that same location. That location, with its corresponding geographic conversion, would have been stored in memory as part of the process.

If the event's geographic location is found in memory, then in step 340 the location is retrieved from memory, with all of its associated information. This associated information is information about the event, such as: 1) the time of the event; 2) participants of the event; 3) location of the event; 4) agenda for the event; 5) confidentiality of the event; and 6) driving directions for the event. This information is generated in one of two ways: 1) it is extracted from the electronic calendar; or 2) it is input by a user.

If, on the other hand, the event's geographic location is not found in memory, the event location will need to be converted to a geographic location. This conversion can be done by using one of the readily available map software tools (two examples of these are: Google Maps and Delorme Street Atlas). The map might be a street map or an indoor building map, such as a planogram. A planogram is an electronically generated representation of a section of retail shelving that is useful for category management and product placement. Planogram images and the dimensional data that goes along with them are often used by planogram software to determine how shelf space can be allocated to products. Although planograms are generally used in the retail arena they can be used for any indoor map, and the images and dimensional data that they generate are readily adapted for use in accordance with an embodiment of the invention wherein scheduled events are plotted on a planogram.

If the event location is an abstract location such as a conference room number or a place/restaurant name it will need to be converted into a location in a building planogram or to a latitude/longitude on an actual map, in the event that this location is not already listed on a map of the user's choice. This can be accomplished in some cases with existing tools such as MapQuest® or Yahoo!® Maps, or other automated mapping tool. In other cases tools specific to a building or organization have to be used. Once the geographic location is computed, it is stored in persistent storage, such as a database, along with its associated information. This information will be stored so that the event location will be readily available and mapped for the next occurrence. For example, assume that a user has plotted a dentist office on the map. The next time the user has a dental appointment, the dentist's office geographic location and any associated information will be readily available in the database, or other memory location.

In some cases the calendar event may already have the geographic location since the user might have created the calendar event by indicating a location for the event from a map or a planogram. In these cases the database may be used to convert the geographic location to a human understandable event location to facilitate easy understanding in the timeline view of the calendar.

Next, in step 360, the geographic location is plotted on an electronic map, with the information retrieved from memory. The map view with the geographic location displayed is generated by the map software in step 370 and in step 380 the map view is displayed to the user. The user can employ any of the proprietary map tools available to perform zoom and pan operations on the map view. The map displayed in step 380 can be displayed on a user's computer, handheld computing device, a cell phone or a geo-location system in an automobile.

A legend, or symbol representing the calendar event, may also be stored along with the event information. This legend will be shown on the map view in close proximity to the event location plotted on the map. The legend is what visually associates the event with the location. The legend could be an icon, a small text box, or even a digital image uploaded by the user. The user can pre-select icons, customize icons or choose from available icons. Additionally, the legend associated with a relative may be a digital image, such as a JPEG image, of that relative. Although legends are used as place markers for locations on a map, they are actually representations of the event. Therefore, the actual location of an event may change, but the legend may remain the same. For example, if one has a standing orthodontist appointment every three weeks, the legend for those scheduled events will remain the same even if the orthodontist changes offices. The information associated with that legend will need to be updated, but the legend will remain the same, perhaps a smiley face with braces. Another example of a legend may be an analog clock face showing the time of the event. After the event is displayed on the map view, a user can drag and drop the event (by clicking on the legend representing the event) from one location to another.

If a user does not explicitly select a legend for the event, a default legend will be used. The default legend may be a small text box showing information about the event, with the text box shown as an overlay on the map. If two events overlap in time the corresponding legends may highlight this fact. One way would be to show overlapping events in a particular color, font, or legend type. If two events occur in the same place but at different times multiple legends occurring in proximity to the location would indicate this aspect. In some embodiments, the events happening in the same place within a specified time period may be grouped together into one legend to reduce the clutter in the map view.

Figure 4:
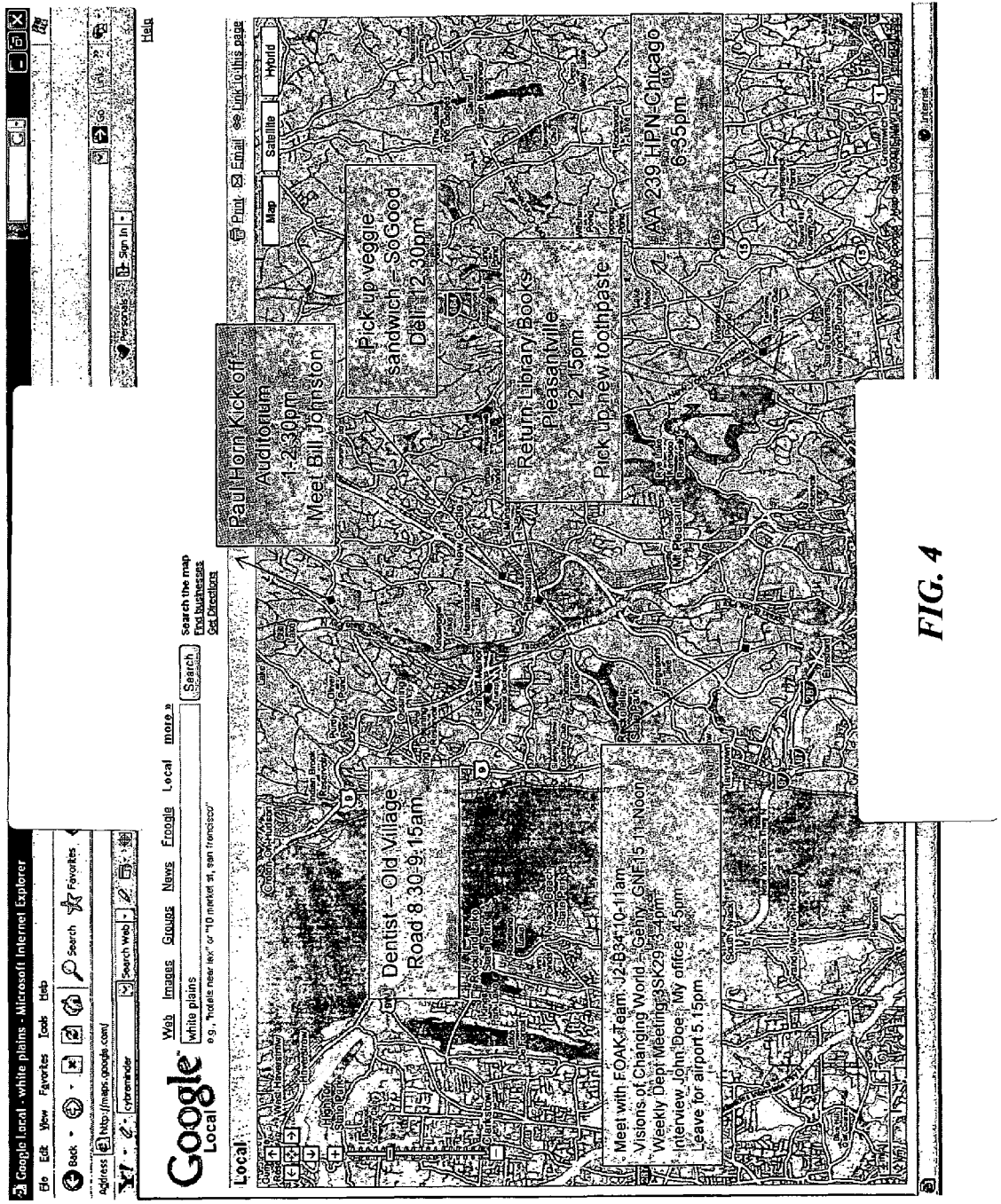
FIG. 4 is a map view of the schedule of FIG. 2, according to an embodiment of the invention.

The user can fluidly switch between a time-based view and a map-based view as is shown in FIGS. 2 and 4. FIG. 2 shows a time-based view of a schedule. FIG. 4 shows the corresponding map view of the schedule of FIG. 2, generated by a known map software tool, according to an embodiment of the present invention. To switch back and forth between the views, a user can simply depress a button on the menu, or on the device. The time interval that is displayed in the time-based view of FIG. 2 is what is used to prepare the map view of FIG. 4. From the user perspective, selecting a time event, perhaps by right-clicking on it, could bring up a GUI (graphical user interface) with options, one of which is the option to plot the event as a location on a map. Other options could allow for entering information about the event and generating driving directions. If a user just wants to view more detailed information about an event, the user can perhaps select the event by single-clicking on its legend on the map or just hovering over it with a cursor. Note that the legends in FIG. 4 are text boxes displaying some information about each event. Selecting one of the text boxes may optionally cause a drop-down menu to appear on the screen when the event is selected. This drop-down menu may have several options, allowing the user to have a choice of: viewing the additional information, adding more information; editing the information; and adding or changing a legend associated with the event.

Double-clicking on the map view of FIG. 4 is one way to switch it back to the time view of FIG. 2. In this way, a user can toggle back and forth between views. Optionally, rather than double-clicking to toggle back and forth, the drop-down menu discussed above may also have an option for selecting type of view.

Referring again to FIG. 4, note that the legends are displayed in a manner that does not interfere with the view of the map. This is important in those cases where several events are located in close proximity. A user may optionally choose to further obscure a legend by not showing it at all unless a cursor is rolled over the area of the event. In some cases a calendar event may include participants from many locations. With such events the system can determine the locations of all the participants and add them as auxiliary geographic locations for the event. When such an event is shown on a map view the user has the option to request that all locations of the attendees be shown on the map. The location of a participant can be determined from their corporate affiliations and directories or address books.

In an alternate embodiment of the present invention, the user can also view an animation that shows the locations of the user's events during the course of the day. For example, an analog clock displays the location of the event as an underlay and then changes the underlay as the clock advances, as is now shown by the illustrations of FIGS. 6-9.

Figure 6:
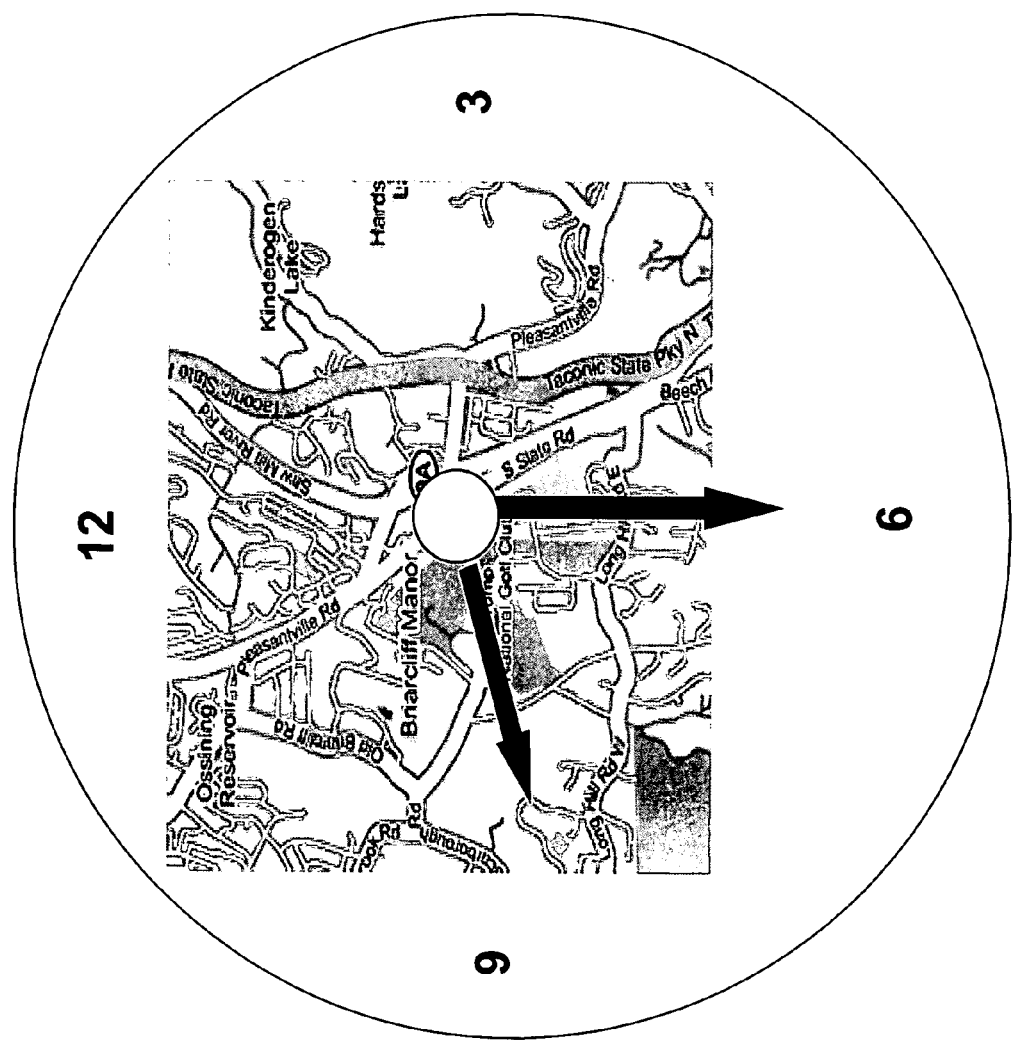
FIG. 6 is an illustration of an alternate map view superimposed on a clock face showing the time at 8:30 o'clock, according to an embodiment of the invention.
Figure 7:
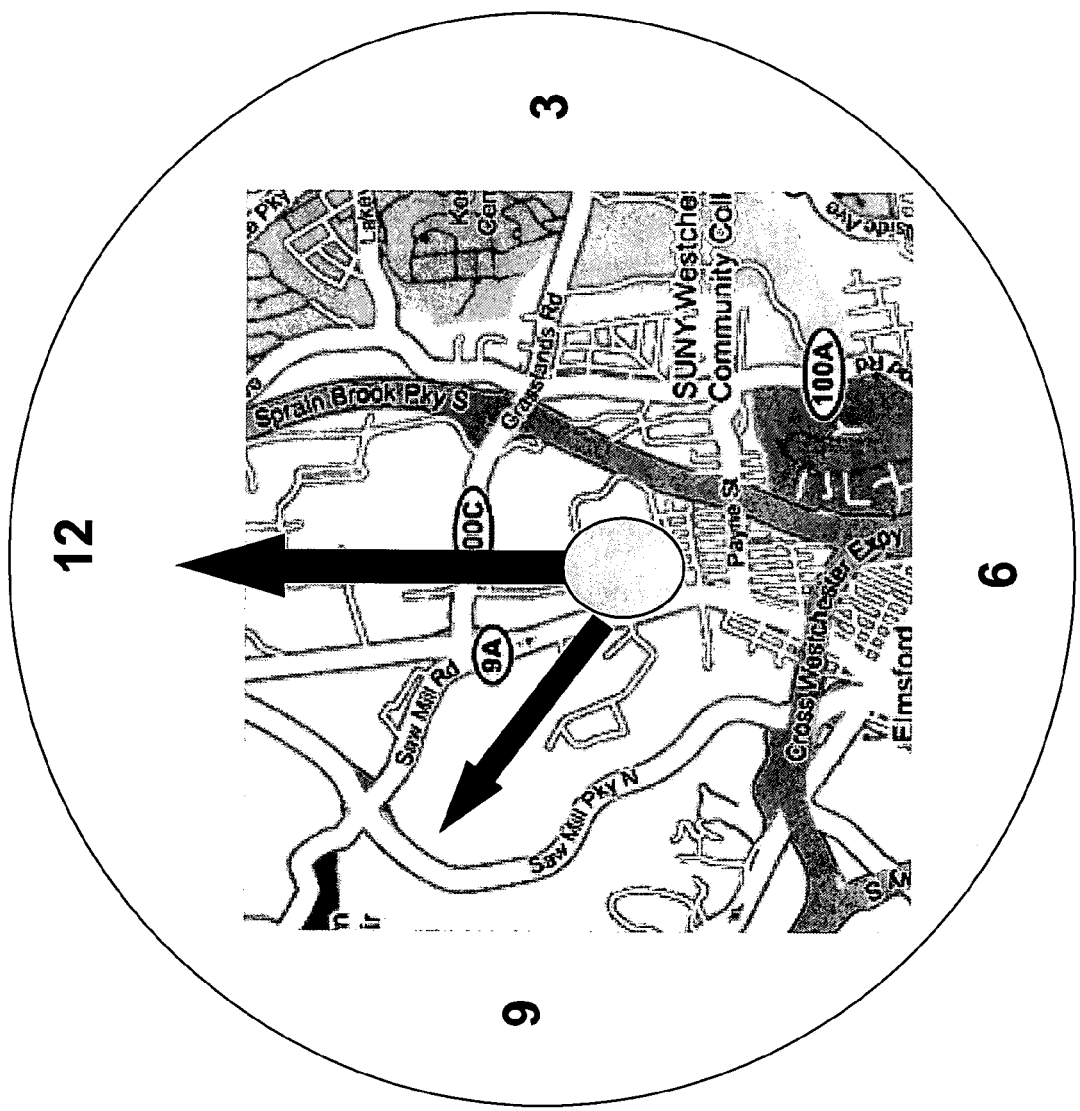
FIG. 7 is an illustration of an alternate map view superimposed on a clock face showing the time at 10:00 o'clock, according to an embodiment of the invention.
Figure 8:
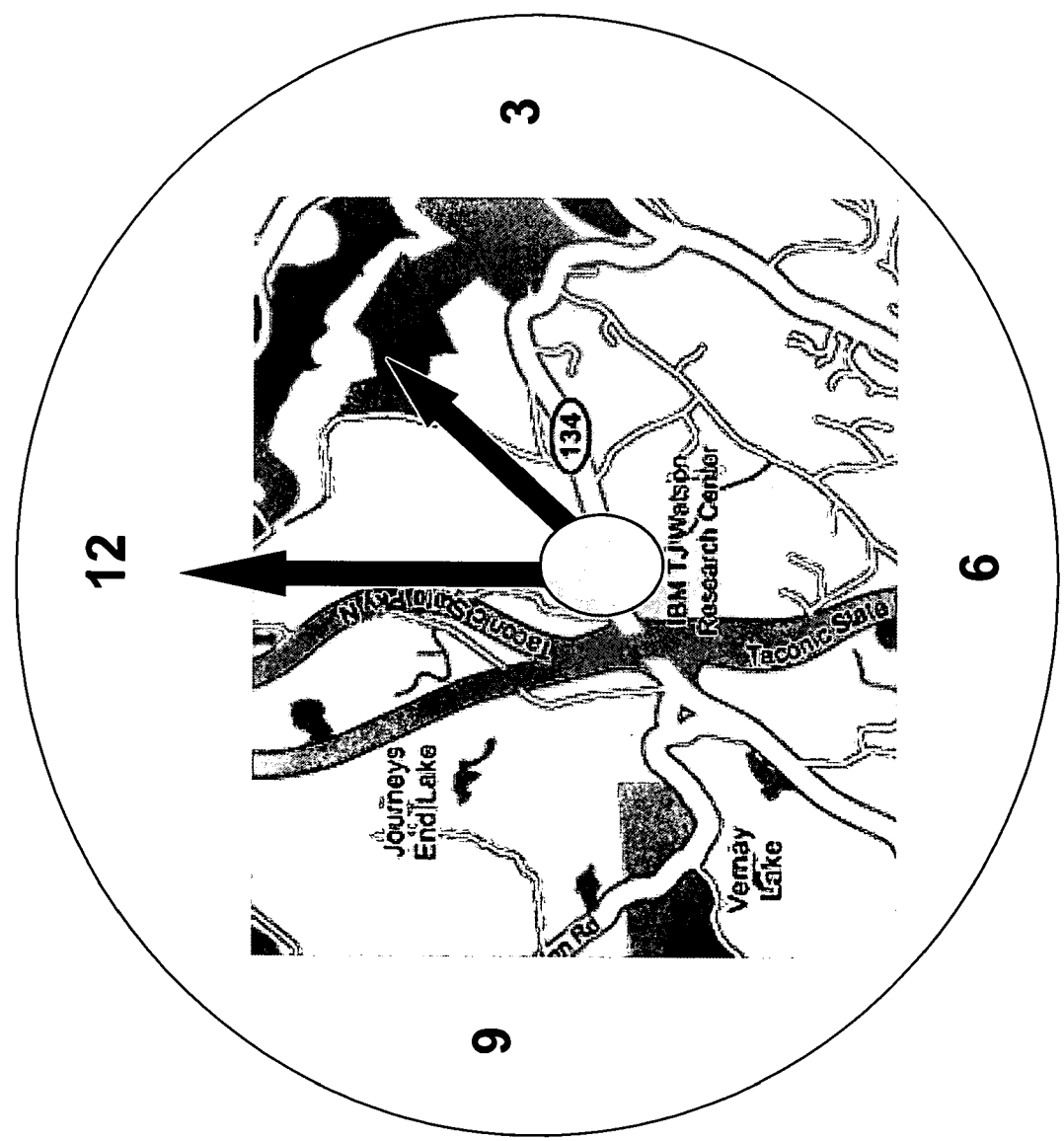
FIG. 8 is an illustration of an alternate map view superimposed on a clock face showing the time at 2:00 o'clock, according to an embodiment of the invention.
Figure 9:
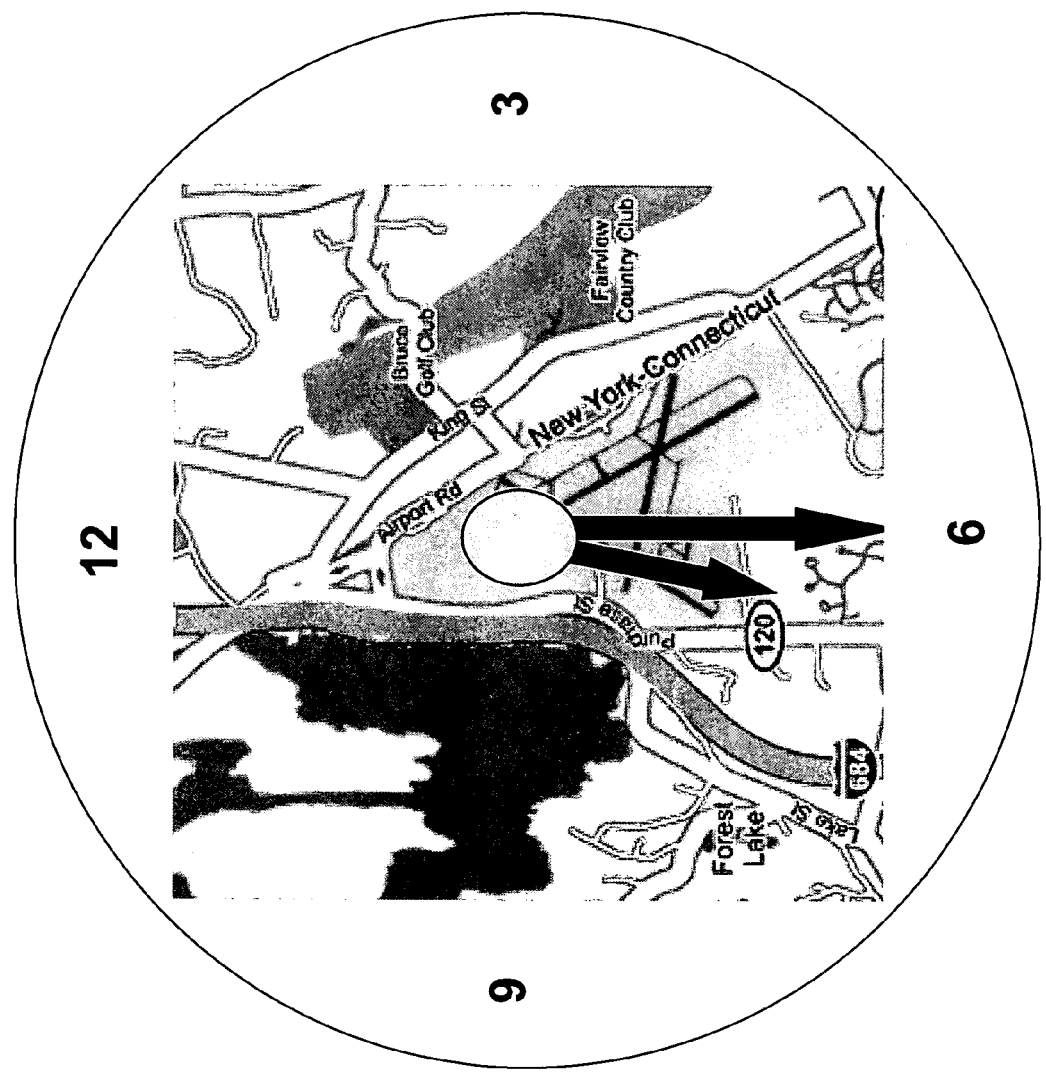
FIG. 9 is an illustration of an alternate map view superimposed on a clock face showing the time at 6:30 o'clock, according to an embodiment of the invention.

FIG. 6 is an illustration of a map view superimposed on a clock face showing the time at 8:30 o'clock. FIG. 7 shows a different part of the map view superimposed on a clock face showing the time at 10:00 o'clock. FIG. 8 shows the time as 2:00 o'clock, with a map view corresponding to the event scheduled for 2:00 o'clock. FIG. 9 shows the time at 6:30 p.m. and the map view has changed accordingly. One mode allows the user to rapidly advance the clock to get a view of all the places with events scheduled for that day. When the time on the clock and the time on the computer match, this may be indicated by rendering the clock view with the map underlay in a particular color or style. When the two times do not match, the user may be alerted to this by using a different rendering style or color. This is a user-specified option.

Figure 5:
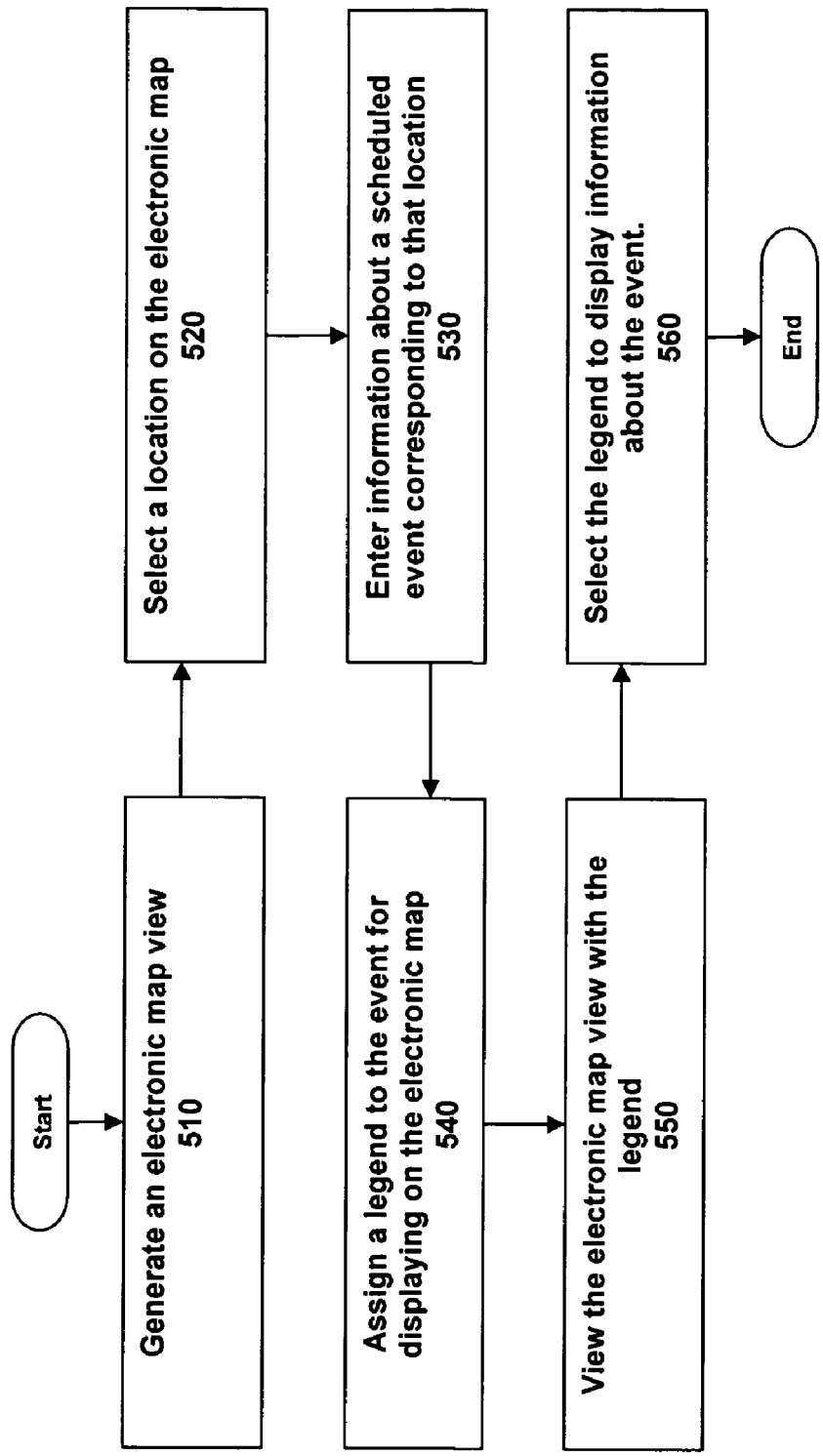
FIG. 5 is a flowchart of a method for generating a map view of an event by selecting a location on a map, according to an embodiment of the present invention.

In another embodiment of the present invention, instead of creating an event starting from a time slot as is the practice today, the user can start from a location on a map or planogram and then specify the time and detailed information for the event. Referring now to FIG. 5 there is shown a flowchart of steps for selecting an event from a map view. The process begins at step 510 with a user generating an electronic map view. As stated earlier, any known map software tool can be used to generate the map view. Once the map view is generated, then in step 520 the user selects a location on the electronic map. This location represents the location of a scheduled event. The user can select this location by clicking on the location on the electronic map.

Next the user is presented with a GUI (graphical user interface) for entering information about the event. This GUI may have a drop-down menu for selecting different options, such as selecting driving directions to/from the location, and selecting a legend for the event in step 540. The legend will be an icon or some other visual display to associate the event with the selected location on the map. This information will be stored in memory for later retrieval. Once the information is stored, the user is presented with the map view in step 550. The map view will show the selected legend in close proximity to the event location. The user has the option of selecting the displayed legend (by right-clicking on it) in step 560 to display the information about the event that was entered in step 530.

An example of a practical application of this embodiment is a realtor scheduling a day with several appointments throughout the city. The realtor needs to show several houses to a buyer and the houses are distributed throughout the city. The realtor consults a map of the area (step 510) and selects the locations (in this case, using street addresses) of the various houses for sale (step 520) on an electronic map in the realtor's car. The realtor then makes appointments to show the houses, using the map as a guide to schedule the appointments according to the locations of the houses. For example, the realtor might choose to show houses starting with the furthest house first and then show houses that are progressively closer to the office to end up close to the office at the end of the day.

Selecting a location brings up a GUI. The realtor then enters useful information about each of the houses (step 530). Examples of useful information are: the time of the showing; the street address of the house; if the house has a lockbox; the code for the lockbox; if the house is empty; if the owners have a dog; and driving directions from the prior appointment and so forth. From a drop-down menu in the GUI the realtor selects a legend of a clock face for each location, showing the time of each appointment (step 540). The realtor then proceeds to the first appointment, consulting the map which now has all of the appointments plotted (step 550). On the way to the appointments the realtor can simply click on a legend to display information about the associated appointment, such as the house address and the lockbox code.

Figure 10:
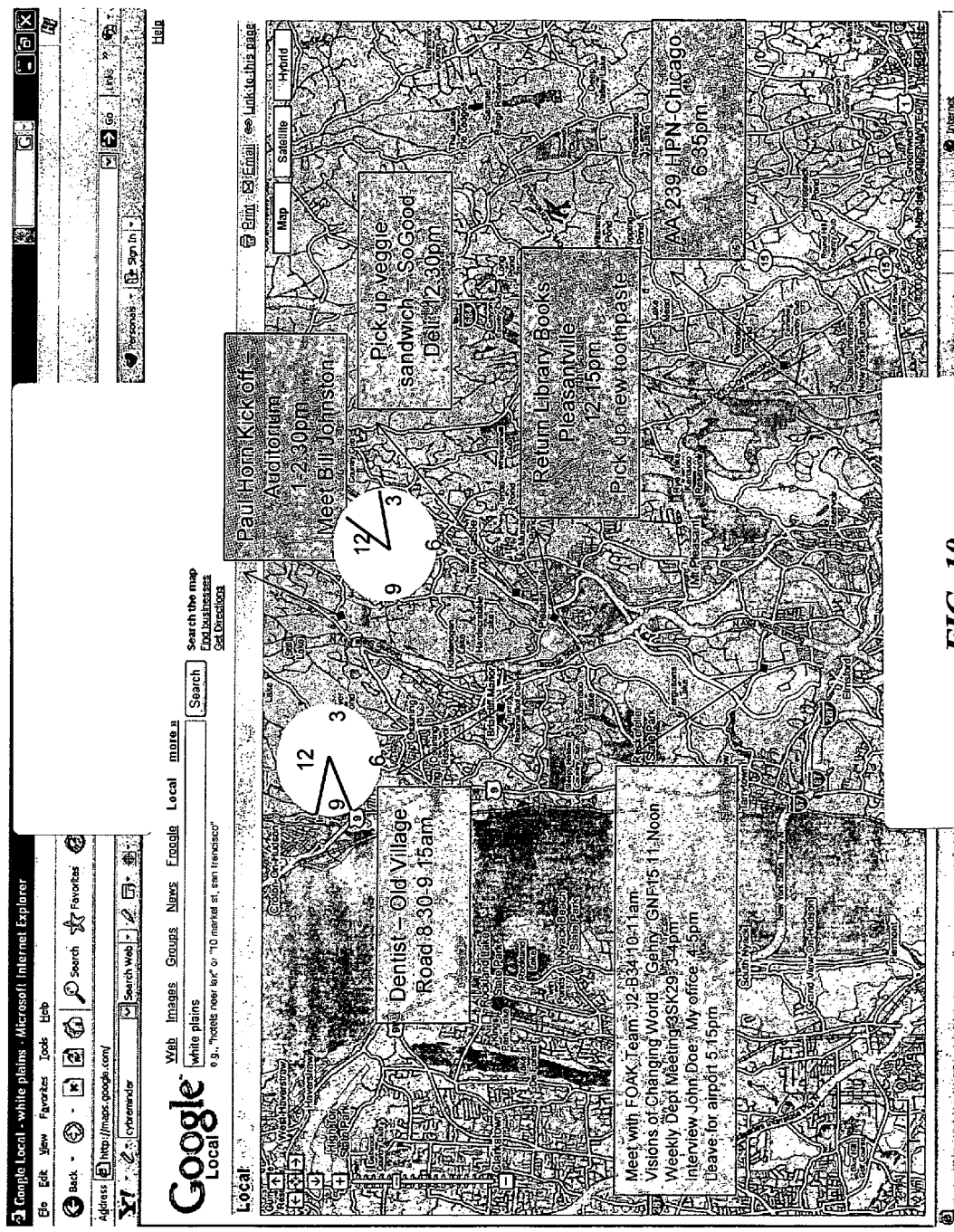
FIG. 10 is an illustration of another alternate map view showing dual legends of text boxes and clock faces, according to an embodiment of the present invention.

FIG. 10 shows another embodiment wherein more than one legend, in this case, a clock face, is displayed on the map view at the same time. The screenshot of FIG. 10 shows the map view of FIG. 4. Six events are shown on this map view, and two of the events show legends of clock faces. Each of the clock faces is set to the time of the scheduled event. FIG. 10 highlights another important feature of the invention wherein all pertinent information about an event is easily available to a user in a compact, efficient manner. As can be seen in FIG. 10, the subject of the events, the location of the events, the times of the events, and the overall view of all events is displayed in a compact, portable manner. This display shown in FIG. 10 could be shown on a user's laptop, automobile system, or personal digital assistant (PDA).

Figure 11:
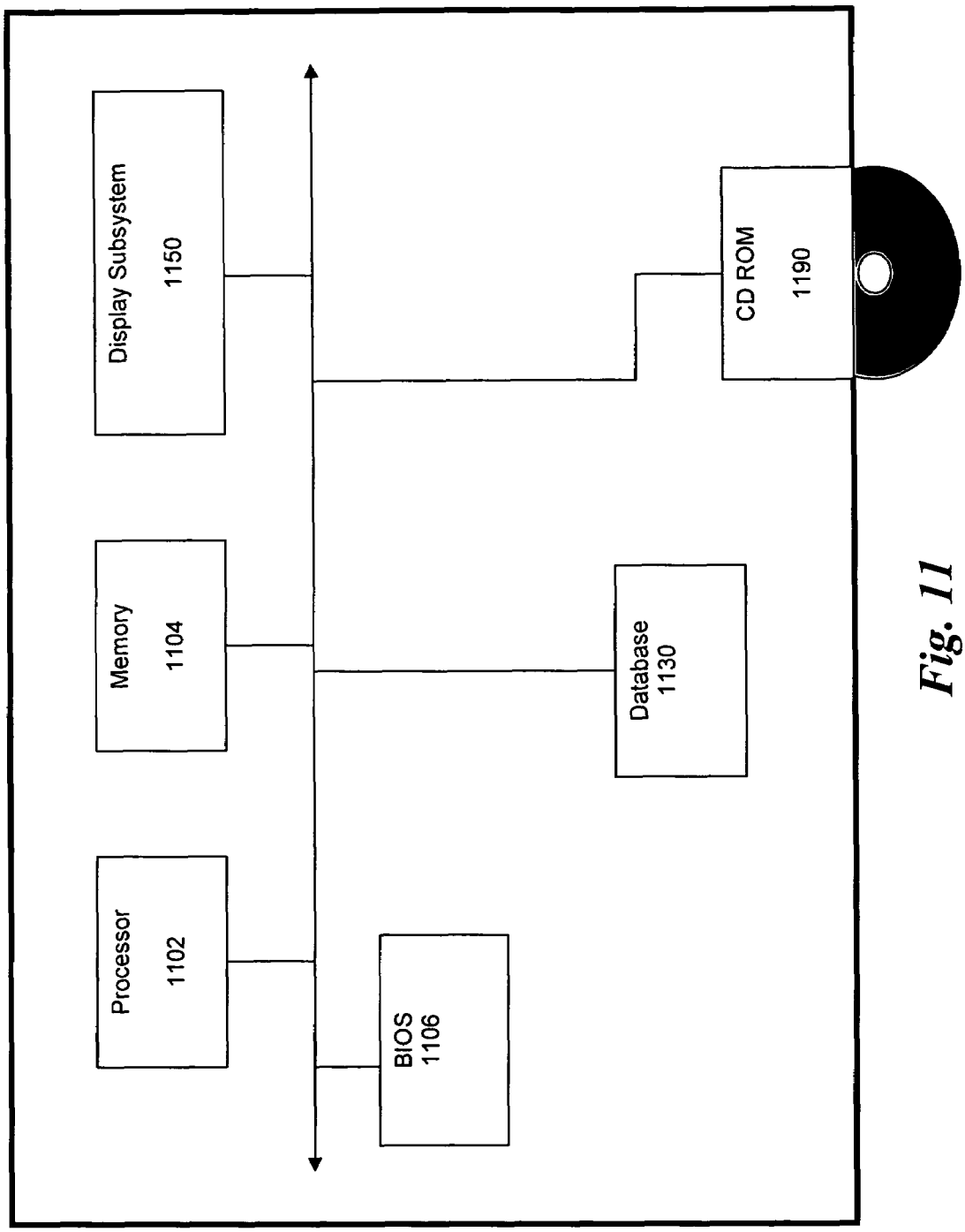
FIG. 11 is a high level block diagram showing an information processing system according to an embodiment of the present invention.

Referring to FIG. 11, there is shown a block diagram of an information handling system 1100 configured to operate according to an embodiment of the invention. The system 1100 comprises a processor 1102, a memory 1104, and an input/output (I/O) subsystem 106. External storage devices containing map and planogram data can also be attached to the input/output subsystem 1106. The memory 1104 represents either a random-access memory or mass storage. It can be volatile or non-volatile. The system 1100 can also comprise a magnetic media mass storage device such as a hard disk drive. Persistent storage, such as a database 1130 is operatively connected to system 1100. The database 1130 could be stored centrally to provide access to several users and contains a repository of stored geographic locations. Geographic locations are mathematical coordinates on a map or a planogram and event locations are common names for locations that people are likely to remember.

The I/O subsystem 1106 may comprise various end user interfaces such as a display, a keyboard, a mouse, and a microphone to operate voice recognition software. Look-up tables for the voice recognition software may be stored in the database 1130. The I/O subsystem 1106 may further comprise a connection to a network such as a local-area network (LAN) or wide-area network (WAN) such as the Internet. In addition, a display subsystem 1150 includes a web browser. According to another embodiment of the invention, a computer readable medium, such as a CDROM 1190 can include program instructions for operating the programmable computer 1100 according to the invention. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention.

We claim:

1. A method for displaying calendar entries on an electronic map, the method comprising steps of:

receiving a request to generate a map view of a selected timeline, wherein the receiving step comprises receiving a calendar entry from the selected timeline, the calendar entry associated with an event location and comprising information about the event;

retrieving a geographic location from persistent storage, the geographic location associated with the event location, wherein the geographic location is a representation of the event location stored in the persistent storage that can be interpreted by an electronic map tool;

generating a map view of the electronic map, the map view comprising:

the geographic location of the calendar entry; and a legend representing the calendar entry; and displaying the map view with the legend representing the calendar entry shown in close proximity to the location of the calendar entry shown on the map view.

2. The method of claim 1, further comprising a step of:
enabling a user to switch between a display of the map view and a display of a view of the selected timeline.

3. The method of claim 1, wherein the legend represents event details of the calendar entry, the event details comprising at least one of a selection of: time of event, duration of event, subject of event, driving directions, attendees at event, teleconference information, and sensitivity.

4. The method of claim 1, further comprising a step of:
displaying a clock view with a map overlay comprising the map view showing the geographic location of the calendar entry corresponding to a time shown in the clock view.

5. The method of claim 4, further comprising a step of:
enabling the user to switch between the display of the map view and the display of the clock view.

6. The method of claim 4 further comprising a step of:
changing the map view displayed in response to time changes.

7. The method of claim 6 wherein the time changes occur as a result of a user manually changing a time on the clock view in order to view the map view associated with a time period other than a current time period.

8. The method of claim 1, further comprising a step of:
receiving a map view over a wide area network, before displaying the map view.

9. The method of claim 1, wherein the step of retrieving the geographic location further comprises steps of:
searching for the event location in the persistent storage in order to retrieve the geographic location associated with the event location; and
if the event location is not found in the persistent storage:
converting the event location to its associated geographic location based on user input to an automated mapping tool; and
storing the event location in the persistent storage, along with its associated geographic location.

10. The method of claim 1, further comprising a step of:
dynamically updating the map view upon receipt of a change to the selected timeline.

11. The method of claim 1, further comprising a step of:
enabling a user to drag and drop the calendar entry from one location on the map view to another location on the map view, in response to a venue change.

12. The method of claim 1 further comprising a step of:
selecting the legend on the map view in order to reveal the event details associated with the legend.

13. The method of claim 12 wherein selecting the legend further comprises touching the legend with a user interface tool.

14. A system for displaying a calendar entry on an electronic map, the system comprising:
a persistent storage for storing location data;
a processor for executing program code wherein the program code enables the processor to:
receive the calendar entry as part of a timeline, said calendar entry associated with an event location, the calendar entry comprising event details;
retrieve a geographic location from persistent storage, the geographic location associated with the event location, wherein the geographic location is a representation of the event location that can be interpreted by an electronic map tool;
generate a map view of the electronic map, the map view comprising:
the geographic location of the calendar entry; and
a legend representing the calendar entry;
display the map view with the corresponding legend shown in close proximity to the location of the calendar entry on the map view;
a network interface;
an input/output interface; and
a display subsystem configured for:
displaying the map view; and
displaying the event details in response to a user selecting the calendar entry.

15. The system of claim 14 wherein the map view changes in response to time changes.

16. The system of claim 14 wherein the map view is displayed as an underlay to a clock view.

17. The system of claim 14 wherein the map view is displayed on a portable device.

18. The system of claim 14, wherein the program code further enables the processor to:
search for the event location in the database in order to retrieve its associated geographic location; and
if the event location was not found in the persistent storage:
convert the event location to its associated geographic location; and
store the event location in the persistent storage, along with its associated geographic location.

19. A method of entering a calendar entry on an electronic map, the method comprising steps of:
receiving the electronic map of a selected geographic location;
selecting a location associated with the calendar entry on the electronic map;
receiving a graphical user interface display upon selecting the location associated with the calendar entry;
entering information associated with the calendar entry on the graphical user interface display, the information comprising event details and a legend to be displayed on the electronic map in close proximity to the selected location associated with the calendar entry; and
viewing the electronic map.

20. A computer readable medium for displaying calendar entries on an electronic map, the medium comprising program code for:
receiving a request to generate a map view of a selected timeline, wherein the receiving step comprises receiving a selection of the calendar entries of the selected timeline, each of the calendar entries associated with an event location and comprising information about the event;
retrieving a geographic location associated with the event location in persistent storage, wherein the geographic location is a representation of the event location that can be interpreted by an electronic map tool;
generating a map view of the electronic map, the map view comprising:
the geographic location of the calendar entry; and
a legend representing the calendar entry; and
displaying the map view with the legend representing the calendar entry shown in close proximity to the location of the calendar entry shown on the map view.

* * * * *